United States Patent [19]
Brodd

[11] Patent Number: 5,498,490
[45] Date of Patent: Mar. 12, 1996

[54] EQUALIZING CHARGE RATES OF INDIVIDUAL BATTERY CELLS

[76] Inventor: Ralph J. Brodd, 15845 LaPrenda Ct., Morgan Hill, Calif. 95037

[21] Appl. No.: 426,481

[22] Filed: Apr. 20, 1995

Related U.S. Application Data

[63] Continuation of Ser. No. 190,625, Feb. 2, 1994, abandoned.
[51] Int. Cl.$^6$ .................................................. H01M 6/18
[52] U.S. Cl. ................................... 429/149; 429/192
[58] Field of Search ........................ 429/49, 192, 191, 429/218, 149, 152, 153

[56] References Cited

U.S. PATENT DOCUMENTS

| | | | |
|---|---|---|---|
| 4,518,665 | 5/1985 | Fujita et al. | 429/153 |
| 4,621,035 | 11/1986 | Bruder | 429/152 |
| 4,997,732 | 3/1991 | Austin et al. | 429/153 |
| 5,227,264 | 7/1993 | Duval et al. | 429/153 |

*Primary Examiner*—Anthony Skapars

[57] ABSTRACT

Charge rates of individual battery cells are equalized and battery safety increased by limiting the amount of current that will flow through the battery in the event of a short circuit either external to or internal to the battery. A solid-polymer battery having a cathodic layer, an anodic layer, an ionically conductive polymeric electrolyte situated intermediate the cathodic layer and the anodic layer, a first electrode electrically connected to the cathodic layer, and a second electrode electrically connected to the anodic layer, has additionally an electronically conductive polymeric layer situated intermediate the first and second electrodes and having a resistivity within a range so as to limit current flow through the battery in case of the occurrence of a short circuit between the cathodic layer and the anodic layer, and to reduce a terminal voltage of the battery no more than few percent as compared to what the terminal voltage of the battery would be without the electronically conductive polymeric layer. The electronically conductive polymeric layer limits the amount of current that will flow through the battery in the event of a short circuit either external to or internal to the battery. Alternatively, a battery is made up of a plurality of electrochemical hi-fold cells each having a relatively thin layer of anode material and a relatively thin strip of cathode material separated from said anode layer by an interposing solid electrolyte layer, thereby forming a cell laminate with the electrolyte layer and the anode layer, the cell laminate being folded at a fold so as to form a bi-fold cell; a cathode current collector strip; and a resistive adhesive polymer applied to a contact area of the cathode current collector strip so as to attach the cathode current collector strip to each of the bi-fold cells at the fold, the adhesive having a resistivity within a range so as to limit current flow through the battery but reducing a terminal voltage of the battery no more than few percent as compared to what the terminal voltage of the battery would be without the resistive adhesive. The resistive adhesive polymer equalizes charge rates of individual battery cells.

30 Claims, 3 Drawing Sheets

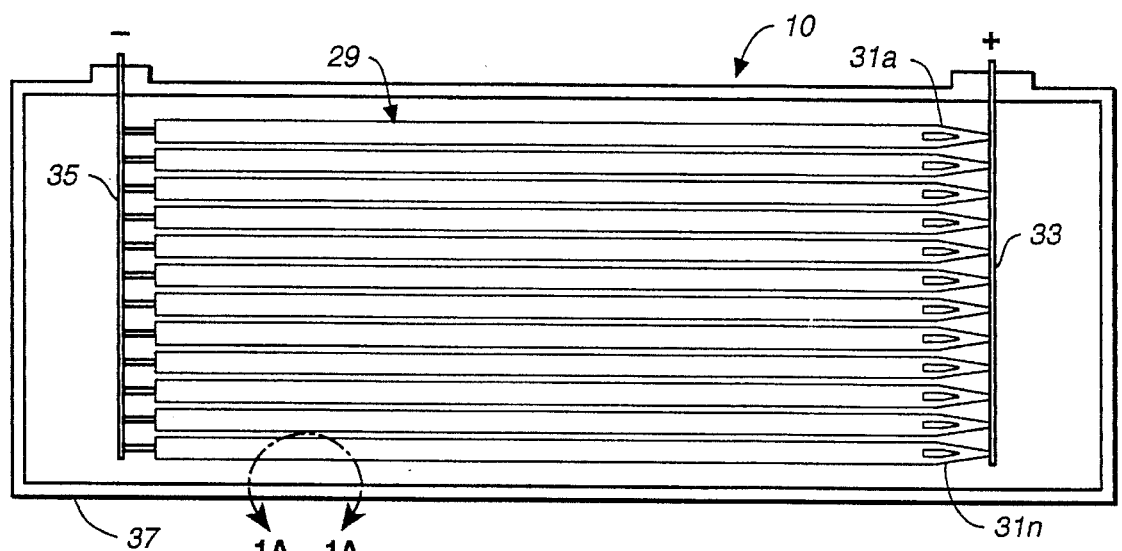
FIG._1
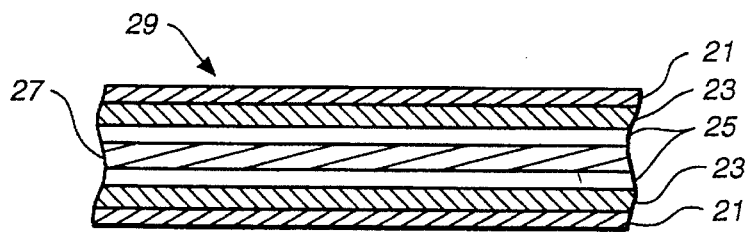
FIG._1A
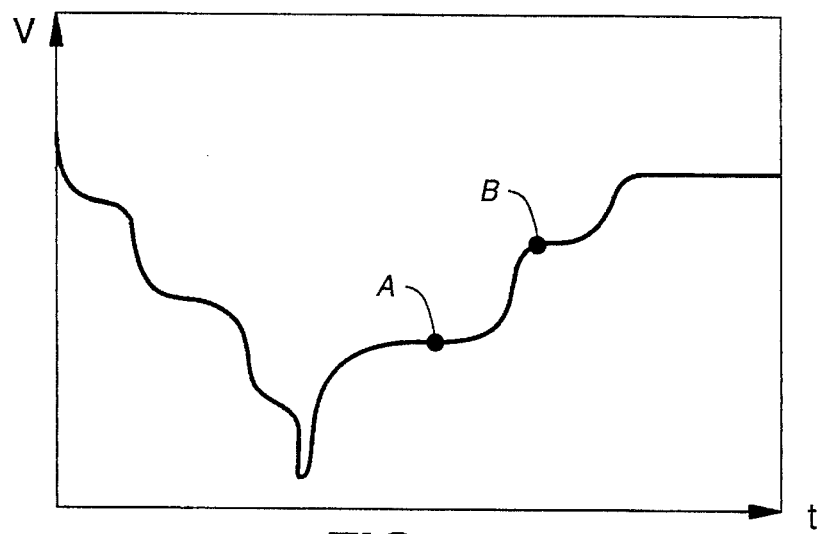
FIG._2

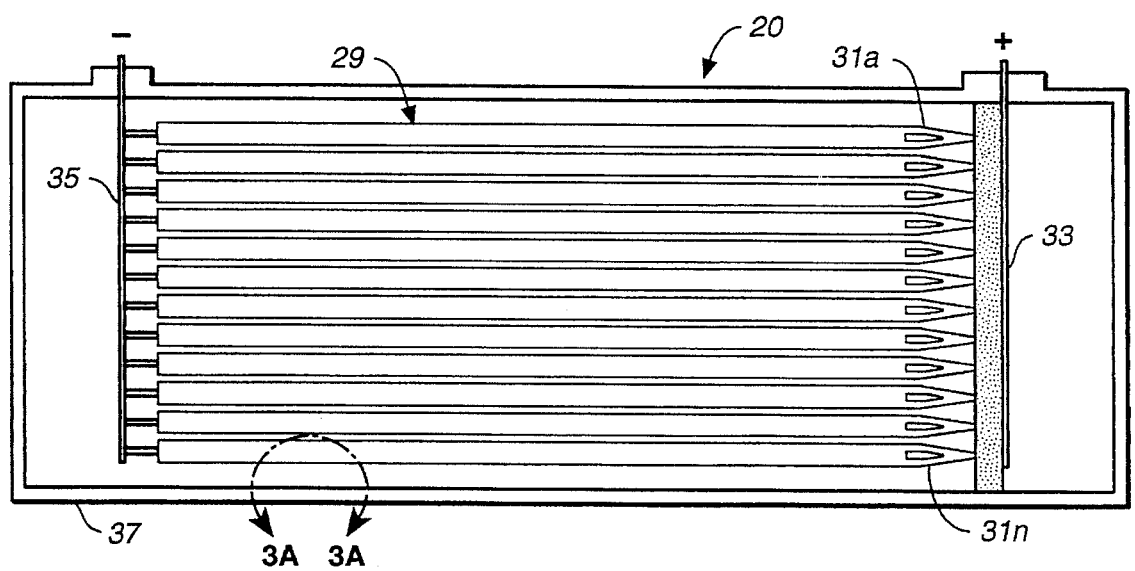
FIG._3
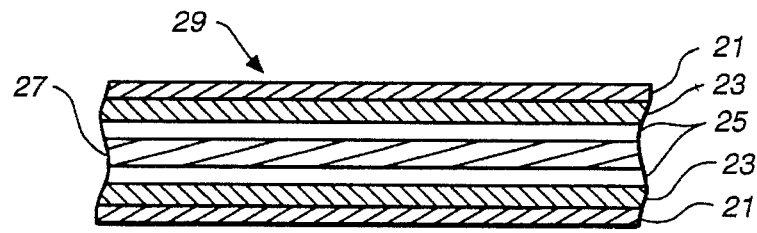
FIG._3A
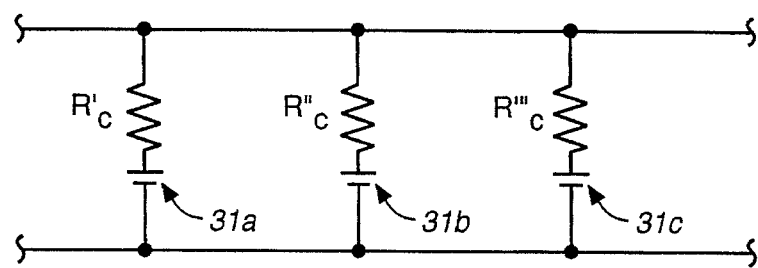
FIG._4

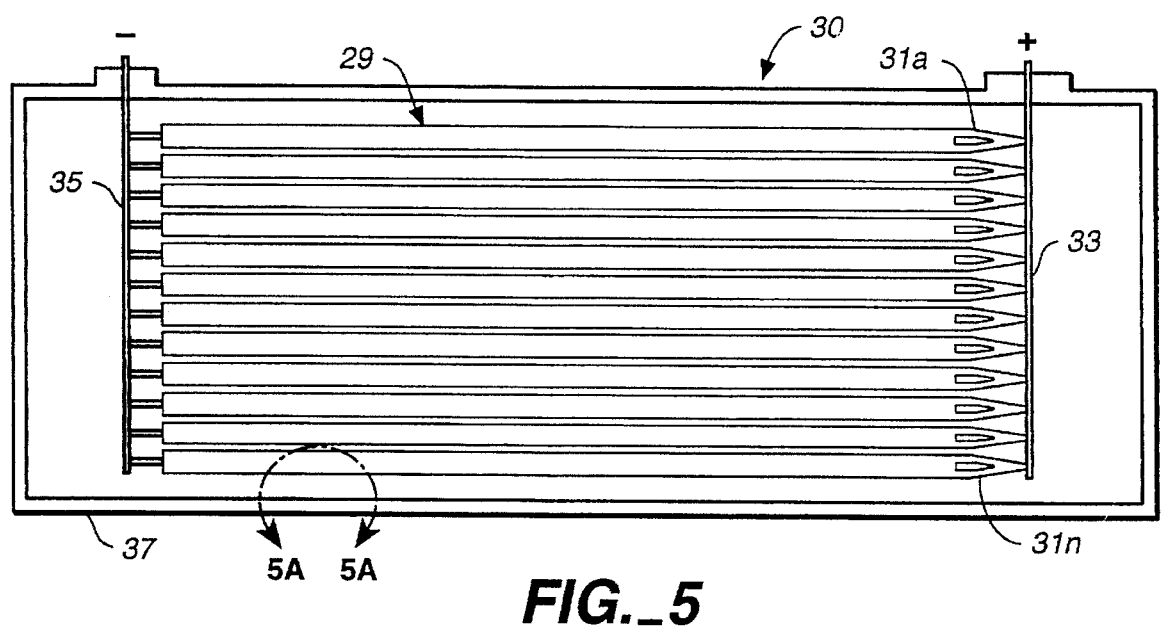
FIG._5
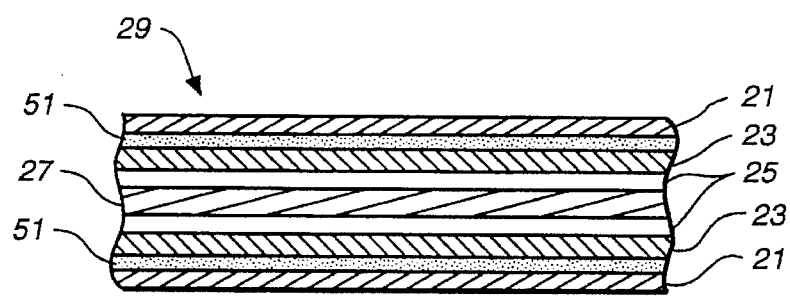
FIG._5A

EQUALIZING CHARGE RATES OF INDIVIDUAL BATTERY CELLS

This application is a continuation of application Ser. No. 08/190,625, filed Feb. 2, 1994, now abandoned.

BACKGROUND OF THE INVENTION

1. Field of the Invention

The present invention relates to batteries and more particularly to rechargeable, or secondary, batteries.

2. State of the Art

Lithium solid-polymer batteries of a type manufactured by the assignee are composed of a lithium metal anode, a single-phase, flexible solid polymer electrolyte and a cathode that stores lithium ions. The electrolyte is a solid, which reduces weight and volume and increases safety. The solid electrolyte battery operates efficiently over a broad temperature range, including room temperature.

In manufacture, cathode and electrolyte materials are coated onto a current collector to form a thin sheet called a laminate. A lithium foil anode is applied to the laminate to form a battery cell. These thin cells can be folded, rolled, or stacked, depending upon the application. A typical battery 10 of the type described is shown in FIG. 1, in which the current collector 21, the cathode 23, the polymer electrolyte 25 and the lithium anode 27 are shown in exploded view. Each solid-polymer battery cell is a bi-fold cell in which a continuous cell laminate 29 formed of the current collector and the cathode is folded about a piece of lithium metal foil 27 to form a "bi-fold cell," i.e., a dual cell formed by a folding process. The bi-fold cells 31a through 31n are stacked and connected in parallel to form a battery of the desired capacity. The current collectors of the cells are each connected to an electrode 33 to form a positive terminal of the battery, and the lithium anodes of each of the cells are all connected to an electrode 35 to form a negative terminal of the battery. Typically, the current collectors are made of aluminum and are spot-welded to a nickel electrode. A copper foil (not shown) is sandwiched between two lithium foils to form the lithium anodes, and the copper foils are spot-welded to another nickel electrode. The cell stack is then sealed in an aluminized outer wrap 37. Further details concerning manufacture of the battery may be found in U.S. patent application Ser. No. 08/073,195, filed Jun. 8, 1993, now U.S. Pat. No. 5,330,856, incorporated herein by reference.

The lithium anode, on discharge, supplies a flow of electrons to the external device. This current powers the external device and then returns to the cathode. Within the battery, the lithium anode and the cathode are separated by the solid polymer electrolyte. The solid polymer electrolyte acts as an electrical insulator, preventing electrons from moving between the lithium anode and the cathode inside the battery. However, the solid polymer electrolyte allows the movement of ions. As electrons are released from the lithium anode to the device, ions are released from the lithium anode, cross through the :solid polymer electrolyte and are stored in the cathode. During the recharge process, ions are transferred through the solid polymer electrolyte back to the lithium anode.

During recharging, the cells exhibit voltage plateaus as the cathode passes through different states as shown in FIG. 2. Ideally, all of the cells would exhibit identical charging characteristics. Because of process variations in both manufacture and chemistry, however, the individual cells will exhibit different efficiencies such that the voltage plateaus of the individual cells will not coincide. The cells therefore exhibit different back-EMFs and charge at different rates. If at some time one cell is in a state A shown in FIG. 2 so as to exhibit a low back-EMF at the same time as some or all of the other cells are in state B so as to exhibit relatively high back-EMFs, the charging rate of the one cell may exceed a recommended charging rate, thereby decreasing cell and battery life. In the extreme case, a sufficiently high charging rate may occur so as to pose a safety hazard. Similarly, under abusive conditions, such as a short-circuit condition, the consequent high current flow results in excess heat generation inside the cell. The heat can melt the lithium and vaporize the electrolyte, possibly resulting in the cell catching fire and burning.

What is needed, then, is a way of equalizing charge rates of individual battery cells, thereby prolonging battery life, and of increasing the safety of batteries of the type described.

SUMMARY OF THE INVENTION

Generally speaking, the present invention, in its different embodiments, equalizes charge rates of individual battery cells and increases battery safety by limiting the amount of current that will flow through the battery in the event of a short circuit either external to or internal to the battery.

More particularly, in one embodiment of the invention, a solid-polymer battery having a cathodic layer, an anodic layer, an ionically conductive polymeric electrolyte situated intermediate the cathodic layer and the anodic layer, a first electrode electrically connected to the cathodic layer, and a second electrode electrically connected to the anodic layer, has additionally an electronically conductive polymeric layer situated intermediate the first and second electrodes and having a resistivity within a range so as to limit current flow through the battery in case of the occurrence of a short circuit between the cathodic layer and the anodic layer, and to reduce a terminal voltage of the battery no more than few percent as compared to what the terminal voltage of the battery would be without the electronically conductive polymeric layer. The electronically conductive polymeric layer limits the amount of current that will flow through the battery in the event of a short circuit either external to or internal to the battery.

In another embodiment of the invention, a battery is made up of a plurality of electrochemical bi-fold cells each having a relatively thin layer of anode material and a relatively thin strip of cathode material separated from said anode layer by an interposing solid electrolyte layer, thereby forming a cell laminate with the electrolyte layer and the anode layer, the cell laminate being folded at a fold so as to form a bi-fold cell; a cathode current collector strip; and a resistive adhesive polymer layer applied to a contact area of the cathode current collector strip so as to attach the cathode current collector strip to each of the bi-fold cells at the fold, the adhesive layer having a resistivity within a range so as to limit current flow through the battery but reducing a terminal voltage of the battery no more than few percent as compared to what the terminal voltage of the battery would be without the resistive adhesive layer. The resistive adhesive polymer layer equalizes charge rates of individual battery cells.

BRIEF DESCRIPTION OF THE DRAWINGS

The present invention may be further understood from the following description in conjunction with the appended drawing. In the drawing:

FIG. 1 is a sectional view of a known lithium solid-polymer battery of the assignee;

FIG. 2 is a graph of a discharge/charge characteristic of the battery of FIG. 1;

FIG. 3 is a sectional view of a battery of a first embodiment of the present invention;

FIG. 4 is an equivalent circuit of the battery of FIG. 3; and

FIG. 5 is a sectional view of a battery of a second embodiment of the present invention.

DETAILED DESCRIPTION OF THE PREFERRED EMBODIMENTS

As used herein, the term "electrochemical cell" refers to a composite structure containing an anode, a cathode and an ion-conducting electrolyte interposed therebetween.

The term "anode" refers to the electrode in an electrochemical cell at which oxidation occurs on discharge. It is typically comprised of a compatible anodic material, i.e. any material which functions as an anode in a solid electrochemical cell. Such compatible anodic materials are well known in the art and include, by way of example, lithium, lithium alloys, such as alloys of lithium with aluminum, mercury, iron, zinc, and the like, and intercalation anodes, such as carbon, tungsten oxides and the like.

The term "cathode" refers to the counterelectrode to the anode. It is typically comprised of a compatible cathodic material, e.g. an insertion compound which is any material which functions as a cathode in an electrochemical cell. Such compatible cathodic materials are well known to the art, and include, by way of example, manganese oxides, molybdenum oxides, vanadium oxides such as $V_6O_{13}$, sulfides of molybdenum, titanium and niobium, chromium oxides, lithiated cobalt oxides, lithiated nickel oxides, copper oxides and the like. The particular compatible cathodic material employed is not critical.

Referring now to FIG. 3, in a battery of a first embodiment of the invention, instead of the current collectors of the battery cells being spot-welded to an electrode forming the negative terminal of the battery, the cells are adhered to the electrode using a resistive adhesive layer 41, such as a conductive plastic. The thickness and resistivity of the adhesive layer are controlled so as to introduce into the current flow path of each cell a controlled resistance. The controlled resistance may be of the same order as the internal resistance of the cell such that the terminal voltage of the battery remains largely unaffected. Alternatively, the controlled resistance may be approximately an order of magnitude greater than the internal resistance of the cell. The internal resistance of the cell then becomes negligible in comparison, and the charging current to each of the cells is essentially controlled by the controlled resistance, identical for each cell. The charging currents of all of the cells are thereby equalized. In practice, the value of the controlled resistance will be chosen so as to effect a trade-off between voltage drop and current control.

The resistive adhesive layer 41 is a compatible electronically conductive material and a polymeric adhesive selected from among starches, proteins, thermoplastic resins and thermosetting resins. For example, the electronically conducting material may be selected from among carbon powder, graphite and acetylene black. The polymeric adhesive is capable of forming an adhesive bond between a metal cathode current collector and the cell. The polymeric adhesive may be selected from among polyolefin, polyacrylic acid (PAA), ethylene-vinyl acetate (EVA), polyvinylacetate, polyurethane, polyacrylate, and cured epoxy compounds. Polyacrylic acid is presently preferred.

Ethylene-vinyl acetate (EVA) is an ethylene copolymer readily available under such trade names as Elvax, Escorene, and Ultrathene. Similar are ethylene copolymers with methyl acrylates, methyl methacrylates, ethyl and butyl. Terpolymers in which the acrylate monomer is the major component may be used, as may copolymers of ethylene with up to 15–20% acrylic or methacrylic acid, the latter offering improved adhesion compared to EVA. Neutralization of ethylene copolymers containing up to 5–10% acrylic of methacrylic acid copolymer with a metal salt such as the acetate or oxide of zinc, sodium, magnesium, barium, or aluminum yields products referred to as ionomers, an example of which is available under the trade name Surlyn. Surlyn has also been found to provide good results.

During formulation of the resistive adhesive layer, its resistivity is controlled by the amount of electronically conducting material added. For greater resistivity, less electronically conducting material is added, and vice versa. The resistive layer is characterized in that it will not melt at the operating temperatures of the cell, it is chemically stable toward the other components of the cell, and it bonds well to metals such as aluminum. Besides equalizing charging currents of the individual cells, the resistive adhesive layer also provides a convenient way of connecting the cells to the electrode of the battery.

By controlling the resistivity and thickness of the resistive adhesive layer, the apparent resistance of each of the battery cells may be controlled as seen in FIG. 4. The cells 31a, 31b, 31c, etc., are connected in parallel between the two electrodes of the battery. The respective cells are connected in series to respective resistances $R'_c$, $R''_c$, $R'''_c$, etc., all of substantially equal values as determined by the resistivity and thickness of the resistive adhesive 41.

In the embodiment of FIG. 3, the resistive adhesive layer 41 is effective to equalize the charge rates of the individual cells, thereby prolonging battery life. In the case of a short-circuit inside a battery cell, however, the amount of current that flows through the cell is determined by the voltage across the cell and the internal resistance of the cell. The resistance provided by the resistive adhesive layer 41, which might otherwise operate to limit the amount of current that flows through the cell, does not come into play because the resistive adhesive layer is external to the cell.

In the embodiment of FIG. 5, a resistive adhesive layer is also used to equalize the charge rates of the individual cells, thereby prolonging battery life. The resistance provided by the resistive adhesive layer, however, is internal to the cell the cell itself and thereby operates to limit the amount of current that flows through the cell in the case of a short-circuit inside the battery cell. The amount of current that flows through the cell is determined by the voltage across the cell and the internal resistance of the cell, including the resistance provided by the resistive adhesive layer.

Referring to FIG. 5, an adhesive 51 is incorporated into the layer structure of the bi-fold cells and act as an adhesion promoter between the current collector 21 (typically aluminum) and the cathode 23. Without the use of an adhesion promoter, an oxide layer forms on the surface of the current collector, interfering with proper adhesion of the cathode layer to the current collector.

An adhesion promoter of the type described has been used in the past in batteries of the type shown in FIG. 1 manufactured by the assignee. In the past, however, the thickness and resistivity of the adhesion promoter have been controlled to minimize to the extent possible the resistance of the layer, thereby avoiding a drop in cell voltage. In the battery cells of FIG. 5, on the other hand, the resistance of the resistive adhesive layer 51 is controlled so as to equalize the charge rates of the individual cells and to limit the amount of current that flows through the cell in the case of a short-circuit inside the battery cell. Both the useful life and the safety of the battery are thereby increased. In general, the resistivity ρ of the resistive adhesive layer 51 in FIG. 5 will be greater than the resistivity $\rho_0$ of the adhesion promoter used in the prior art.

EXAMPLE

Assume a battery cell having a capacity of 0.6 Ahr and an electrode surface area of 400 cm². A typical electrical device is to be operated at a one hour discharge rate of 1.5 mA/cm² or less. A voltage loss E of 0.05 volts is assumed to be tolerable in a cell having an open circuit voltage of 3.0 volts. Using Ohm's law (E=IR), the resistance of the resistive adhesive layer is then calculated as follows:

$$R = \frac{0.05}{0.0015} = 33 \text{ ohms-cm}^2$$

The resistance of the adhesion promoter used previously in batteries of the type shown in FIG. 1 is much less than the foregoing value. Using this value, the current from the battery is then limited to:

$$I = \frac{3.0}{33} \approx 0.1 \text{ amps/cm}^2$$

This amount of current is well over that required for normal operation and should not interfere with the ability of the battery to operate various devices.

Using a resistive adhesive layer in a layer-structured battery in the manner described, charge rates of individual battery cells may be equalized and battery safety may be increased by limiting the amount of current that will flow through the battery in the event of a short circuit either external to or internal to the battery. Besides equalizing charging currents of the individual cells, the resistive adhesive layer may also provide a convenient way of connecting the cells to the electrode of the battery. Incorporating the resistive adhesive layer into the battery does not require any substantial modification of the existing battery structure or composition.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A battery comprising:
   a plurality of electrochemical bi-fold cells each comprising:
      a layer of anode material; and
      a layer of cathode material separated from said anode layer by an interposing solid electrolyte layer, thereby forming a cell laminate with said electrolyte layer and said anode layer, said cell laminate being folded at a fold;
   a cathode current collector strip; and
   a resistive adhesive polymer layer attaching said cathode current collector strip at a contact area thereof to each of said bi-fold cells at said fold;
   said resistive layer having a resistivity R controlled so as to be substantially equal to $(P \times V_{oc})/I_{dr}$ where $V_{oc}$ is an open-circuit voltage of said battery in volts, $I_{dr}$ is a nominal discharge rate of said battery in amperes-cm², and P is a percentage voltage drop.

2. A battery according to claim 1, wherein said resistive adhesive polymer layer comprises a compatible electronically conductive material and a polymeric adhesive selected from the group consisting of starches, proteins, thermoplastic resins and thermosetting resins.

3. A battery according to claim 2, wherein said electronically conducting material is selected from carbon powder, graphite, acetylene black, gold, platinum, and tungsten carbide.

4. A battery according to claim 1, wherein said polymeric adhesive is selected from the group consisting of polyolefin, polyacrylic acid, polyvinylacetate, polyurethane, polyacrylate cured epoxy compounds, ionomers and copolymers thereof.

5. In a solid-polymer battery having a cathodic layer, an anodic layer, an ionically conductive polymeric electrolyte situated intermediate the cathodic layer and the anodic layer, a first electrode electrically connected to the cathodic layer, and a second electrode electrically connected to the anodic layer, an electronically conductive polymeric layer situated intermediate the first and second electrodes and having a resistivity R controlled so as to be substantially equal to $(P \times V_{oc})/I_{dr}$ where $V_{oc}$ is an open-circuit voltage of said battery in volts, $I_{dr}$ is a nominal discharge rate of said battery in amperes-cm², and P is a percentage voltage drop.

6. The apparatus of claim 5, wherein said anodic layer comprises a lithium metal foil.

7. The apparatus of claim 6, wherein said cathodic layer comprises vanadium oxide.

8. The apparatus of claim 7, wherein said ionically conductive polymeric electrolyte comprises a solid polymeric matrix, an inorganic ion salt and a solvent.

9. The apparatus of claim 8, wherein said electronically conductive polymeric layer comprises one of polyacrylic acid, polyvinylacetate, and an ionomer and forms an adhesive bond between said first electrode and said cathodic layer.

10. The apparatus of claim 5, wherein said electronically conductive polymeric layer comprises one of polyacrylic acid, polyvinylacetate, and an ionomer and forms an adhesive bond between said first electrode and said cathodic layer.

11. A battery comprising:
    a plurality of solid-polymer battery cells, each having a cathodic layer, an anodic layer, an ionically conductive polymeric electrolyte situated intermediate the cathodic layer and the anodic layer, a first electrode electrically connected to the cathodic layer, and a second electrode electrically connected to the anodic layer, the plurality of cells being stacked with end portion of all of the cells remaining exposed; and
    an electronically conductive polymeric layer applied to the end portions of all of the cells in contact with an electrode of each of the cells and having a resistivity R controlled so as to be substantially equal to $(P \times V_{oc})/I_{dr}$ where $V_{oc}$ is an open-circuit voltage of said battery in volts, $I_{dr}$ is a nominal discharge rate of said battery in amperes-cm², and P is a percentage voltage drop.

12. The apparatus of claim 11, wherein each of said solid-polymer battery cells is a bi-fold cell in which said cathodic layer and said ionically conductive polymeric electrolyte together form a continuous cell laminate and are folded about a single anodic layer.

13. The apparatus of claim 12, wherein said anodic layer comprises a lithium metal foil.

14. The apparatus of claim 6, wherein said cathodic layer comprises an insertion compound.

15. The apparatus of claim 7, wherein said ionically conductive polymeric electrolyte comprises a solid polymeric matrix, an inorganic ion salt and a solvent.

16. The apparatus of claim 8, wherein said electronically conductive polymeric layer is selected from the group consisting of polyacrylic acid, polyvinylacetate, and an ionomer and forms an adhesive bond between said first electrode and said cathodic layer.

17. The apparatus of claim 11, wherein said electronically conductive polymeric layer comprises one of polyacrylic acid, polyvinylacetate, and an ionomer and forms an adhesive bond between said first electrode and said cathodic layer.

18. In a solid-polymer battery having a cathodic layer, an anodic layer, an ionically conductive polymeric electrolyte situated intermediate the cathodic layer and the anodic layer, a first electrode electrically connected to the cathodic layer, and second electrode electrically connected to the anodic layer, an electronically conductive polymeric layer situated intermediate the first and second electrodes and having a resistivity R controlled so as to be substantially equal to $(P \times V_{oc})/I_{dr}$ where $V_{oc}$ is an open-circuit voltage of said battery in volts, $I_{dr}$ is a nominal discharge rate of said battery in amperes-cm$^2$, and P is a percentage voltage drop.

19. The apparatus of claim 5, wherein said anodic layer comprises a lithium metal foil.

20. The apparatus of claim 6, wherein said cathodic layer comprises an insertion compound.

21. The apparatus of claim 7, wherein said ionically conductive polymeric electrolyte comprises a solid polymeric matrix, an inorganic ion salt and a solvent.

22. The apparatus of claim 8, wherein said electronically conductive polymeric layer comprises one of polyacrylic acid, polyvinylacetate, and an ionomer and forms an adhesive bond between said first electrode and said cathodic layer.

23. The apparatus of claim 5, wherein said electronically conductive polymeric layer comprises one of polyacrylic acid, polyvinylacetate, and an ionomer and forms an adhesive bond between said first electrode and said cathodic layer.

24. A battery comprising:

a plurality of solid-polymer battery cells, each having a cathodic layer, an anodic layer, an ionically conductive polymeric electrolyte situated intermediate the cathodic layer and the anodic layer, a first electrode electrically connected to the cathodic layer, and a second electrode electrically connected to the anodic layer, the plurality of cells being stacked with end portions of all of the cells remaining exposed; and an electronically conductive polymeric layer applied to the end portions of all of the cells in contact with an electrode of each of the cells and having an electronically conductive polymeric layer situated intermediate the first and second electrodes and having a resistivity R controlled so as to be substantially equal to $(P \times V_{oc})/I_{dr}$ where $V_{oc}$ is an open-circuit voltage of said battery in volts, $I_{dr}$ is a nominal discharge rate of said battery in amperes-cm$^2$, and P is a percentage voltage drop.

25. The apparatus of claim 11, wherein each of said solid-polymer battery cells is a bi-fold cell in which said cathodic layer and said ionically conductive polymeric electrolyte together form a continuous cell laminate and are folded about a single anodic layer.

26. The apparatus of claim 12, wherein said anodic layer comprises a lithium metal foil.

27. The apparatus of claim 6, wherein said cathodic layer comprises an insertion compound.

28. The apparatus of claim 7, wherein said ionically conductive polymeric electrolyte comprises a solid polymeric matrix, an inorganic ion salt and a solvent.

29. The apparatus of claim 8, wherein said electronically conductive polymeric layer comprises one of polyacrylic acid, polyvinylacetate, and an ionomer and forms an adhesive bond between said first electrode and said cathodic layer.

30. The apparatus of claim 11, wherein said electronically conductive polymeric layer comprises one of polyacrylic acid, polyvinylacetate, and an ionomer and forms an adhesive bond between said first electrode and said cathodic layer.

* * * * *